United States Patent Office 3,174,965
Patented Mar. 23, 1965

3,174,965
6-FLUORO-16-METHYL-STEROIDS OF THE PREGNANE SERIES
Frank H. Lincoln, Kalamazoo, William P. Schneider, Kalamazoo Township, Kalamazoo County, and George B. Spero, Kalamazoo, Mich., assignors to The Upjohn Company, Kalamazoo, Mich., a corporation of Delaware
No Drawing. Filed May 11, 1959, Ser. No. 812,124
11 Claims. (Cl. 260—239.55)

This invention relates to certain novel steroids, more particularly 6α-fluoro-16-methyl-17α,21-dihydroxy-4-pregnene-3,20-dione, 21-esters thereof, certain novel 5α-hydroxy-6β-fluoro-16-methyl intermediates in the production thereof and to a process for the production thereof.

The 6α-fluoro-16-methyl-17α,21-dihydroxy-4-pregnene-3,20-dione and 21-esters thereof can be prepared from 16α-methylpregnenolone and 16β-methylpregnenolone by two routes. These routes and the compounds thus produced can be represented by the following formulae:

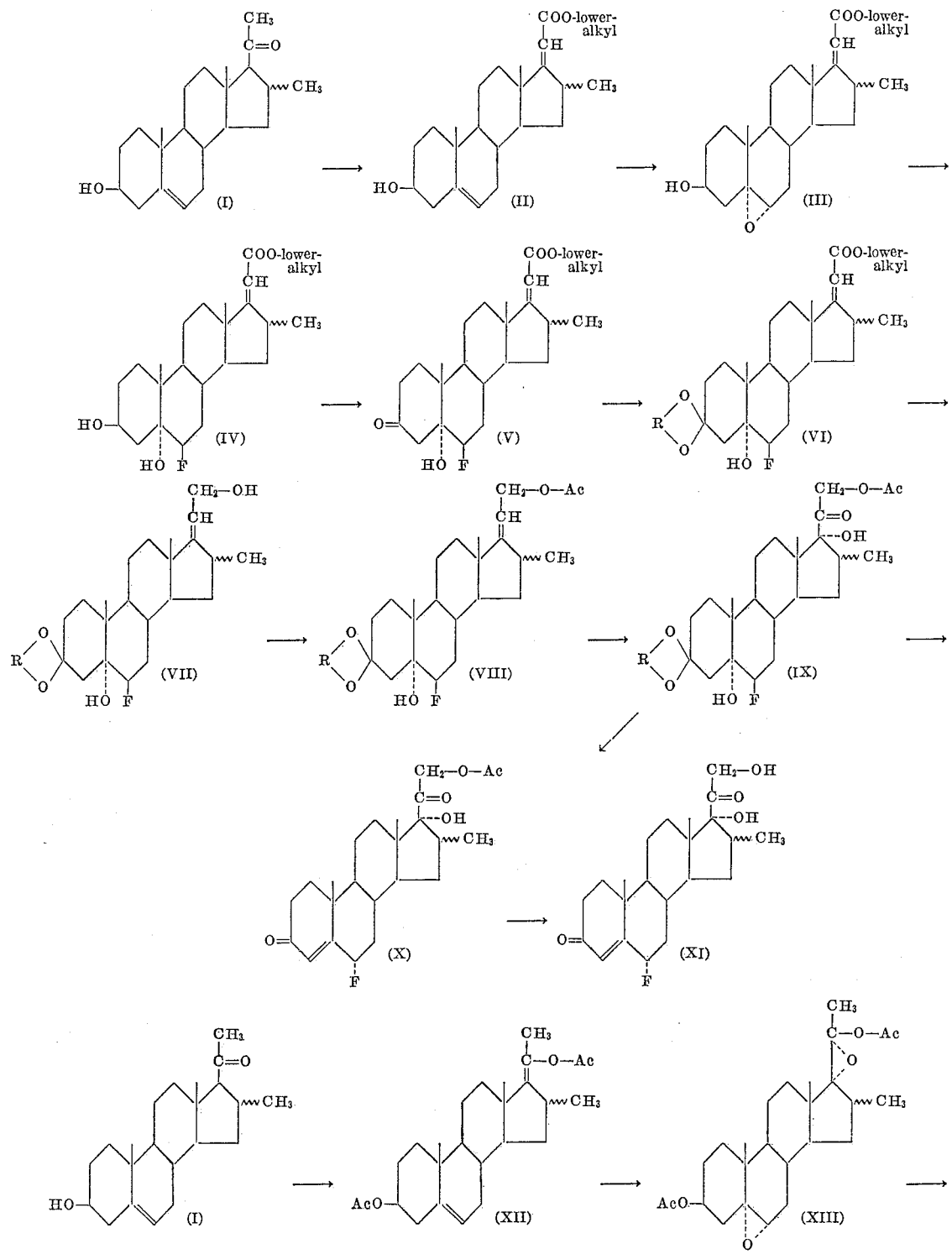

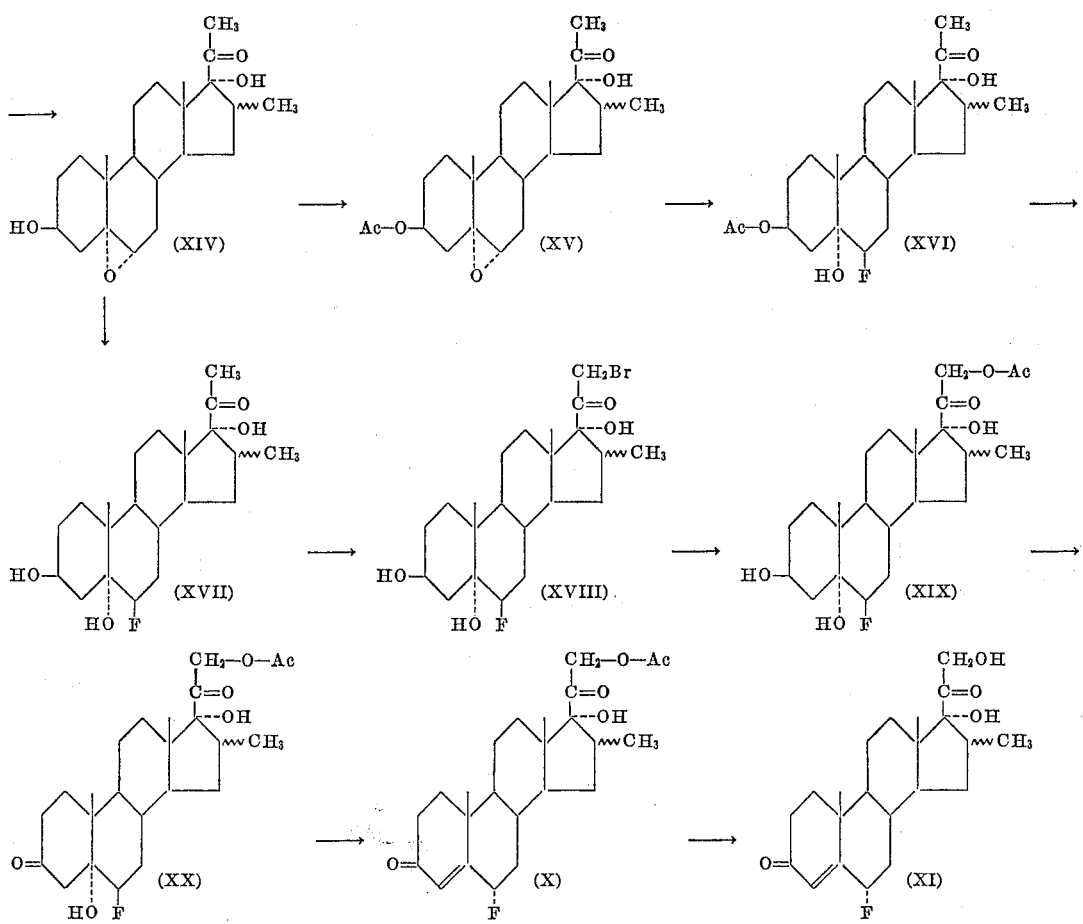

wherein lower-alkyl means containing from 1 to 8 carbon atoms, inclusive, R is lower alkylene containing from 1 to 8 carbon atoms, inclusive, and from 2 to 3 carbon atoms in the chain connecting the oxygen atoms, Ac is the acyl radical of a hydrocarbon carboxylic acid, including α,ω-dicarboxylic acids, and the wavy line to the 16-methyl group represents both the alpha and beta stereoconfiguration.

The novel 6α - fluoro - 16-methyl-17α,21-dihydroxy-4-pregnene-3,20-dione and 21-esters thereof of this invention (X, XI) are useful as intermediates in the production of 6α-fluoro-16-methyl-11β,17α,21-trihydroxy-4-pregnene-3,20-dione and 21-esters thereof, wherein the 16-methyl group is either α- or β-, e.g., by reaction with an 11β-hydroxylating species of fungus, e.g., *Cunninghamella blakesleeana, Curvularia lunata, Trichothecium roseum,* etc., according to procedures well known in the art, e.g., U.S. 2,602,769, Example 22. These latter compounds possess outstanding pharmacological activity, e.g., anti-inflammatory activity, and thus are useful in the same situations as hydrocortisone and prednisolone. These same compounds (X, XI) are also useful as intermediates in the production of the corresponding 11α-hydroxy compounds, i.e., 6α-fluoro-16α- and 16β-methyl-17α,21-dihydroxy-4-pregnene-3,20-dione, e.g., by microbiological converison with *Aspergillus nidulans* or *niger* and *Sporotrichum sulfurescens* according to procedures well known in the art. Acetylation with an acid anhydride or chloride of a lower-hydrocarbon carboxylic acid, e.g., acetic anhydride in pyridine, produces the corresponding esters thereof.

Molar equivalent amounts of the acylating agent will produce the 21-monoester, a large excess will produce the 11,21-diesters. These compounds possess physiological properties per se, including anti-inflammatory activity, and the 11α-hydroxy compounds can be oxidized, e.g., N-bromoacetamide or chromic acid, to produce the corresponding 11-keto compounds described above or carried through the 9α-fluoro chemistry, e.g., dehydration with 11-bromoacetamide and anhydrous sulfur dioxide to produce the corresponding 9(11)-compound, acetylation of the 21-hydroxy group, if it is not already esterified, adding the elements of HOBr, e.g., with aqueous N-bromoacetamide in the presence of perchloric acid, to produce the corresponding 9α-bromo - 11β - hydroxy compound which is then reacted with base, e.g., potassium acetate or potassium hydroxide, to produce the corresponding 9β,11β-epoxide which is then reacted with anhydrous or aqueous hydrogen fluoride to produce the corresponding 9α-fluoro-11β-hydroxy compound, e.g., 6α,9α-difluoro-11β,17α,21 - trihydroxy - 16α - methyl-4-pregnene - 3,20-dione 21-acetate. Moreover, surprisingly the novel 6α-fluoro - 16 - methyl - 17α,21 - dihydroxy - 4 - pregnene-3,20-dione and 21-esters thereof also possess anti-inflammatory activity of about the order of hydrocortisone, a most surprising activity as heretofore an 11β-hydroxy group or an 11-keto group was believed necessary in order for a compound to possess anti-inflammatory activity.

ROUTE A

In carrying out the process of this invention according to this route, 16α-methylpregnenolone or 16β-methylpregnenolone (hereinafter the two 16-stereoisomers are referred to collectively as 16-methyl) is reacted with diethyl oxalate and sodium methoxide to produce the sodium enolate of 16-methyl-21-ethoxyoxalylpregnenolone. Without isolation, this compound is converted with potassium acetate and two moles of bromine to 16-methyl-21,21-dibromo-21-ethoxyoxalylpregnenolone. Also without isolation, this compound is converted with a potassium or sodium lower-alkoxide and a lower-alkanol, e.g., wherein the alkyl group is methyl, ethyl, propyl, n-butyl, amyl, hexyl, heptyl, or octyl, to produce 3β-hydroxy-16-methyl-5,17(20)-pregnadien-21-oic acid lower-alkyl ester (II). This compound is epoxidized according to procedures known in the art, e.g., with peracetic acid, perbenzoic acid, or other peroxy compound known to be useful in converting isolated double bonds to epoxides to produce 3β-hydroxy-5α,6α-epoxy-16-methyl-17(20)-pregnen-21-oic acid lower-alkyl ester (III). A by-product in the reaction is the corresponding 5β,6β-epoxide which is preferably removed by fractional crystallization or chromatography of the reaction mixture. This 5α,6α-epoxy compound is then reacted with aqueous hydrofluoric acid, e.g., at 0° to 30° C., or with anhydrous hydrofluoric acid, preferably in the presence of a tetrahydrofuran, e.g., at −60° C. to +20° C., to produce 3β,5α-dihydroxy-6β-fluoro-16-methyl-17(20)-pregnen-21-oic acid lower-alkyl ester (IV). This compound is then oxidized, e.g., with an N-haloamide or N-haloimide in pyridine, with chromic anhydride and dilute sulfuric acid in acetone or methylene chloride or sodium dichromate in glacial acetic acid, or other known 3-hydroxy oxidizer to produce 3-keto-5α-hydroxy-6β-fluoro-16-methyl-17(20)-pregnen-21-oic acid lower-alkyl esters (V). This compound is then ketalized with a lower-alkylene α- or β-glycol, or the corresponding dioxolane of a lower-alkylene glycol and acetone or methyl ethyl ketone, e.g., 2-methyl-2-ethyldioxolane, in the presence of an acid catalyst, e.g., p-toluenesulfonic acid or a drop of concentrated sulfuric acid, to produce a 3-ketalized 3-keto-5α-hydroxy-6β fluoro-16-methyl-17(20)-pregnen-21-oic acid lower-alkyl ester (VI) wherein R is, e.g., ethylene, trimethylene, propylene, 2,2-dimethyl-trimethylene, amylene, octylene, etc. The side chain of this compound is then reduced with an alkali-metal aluminum hydride to produce the corresponding 3-ketalized 5α,21-dihydroxy-16α-methyl-17(20)-pregnen-3-one (VII). The 21-hydroxy group of this compound is then esterified with an anhydride or acid halide of, e.g., lower-hydrocarbon carboxylic acid containing from 1 to 12 carbon atoms, including dicarboxylic acids, in pyridine or with an acid, e.g., formic, or an ester in the presence of an acid catalyst, to produce the corresponding 3-ketalized 5α,21-dihydroxy-6β-fluoro-16-methyl-17(20)-pregnen-3-one 21-acylate (VIII). This compound is then oxidatively hydroxylated, e.g., with osmium tetroxide and hydrogen peroxide, a peracid, e.g., peracetic, an alkyl peroxide, e.g., tert.-butylperoxide, a tertiaryamine oxide peroxide, e.g., N-methylmorpholine oxide peroxide or an aryliodo oxide, e.g., phenyliodoso acetate, to produce the corresponding 3-ketalized 5α,17α,21-trihydroxy-6β-fluoro-16-methylpregnane-3,20-dione 21-acylate (IX). The ketal group is then removed, under acidic conditions preferably in the presence of a lower alkanol, e.g., anhydrous hydrogen chloride in chloroform in the presence of ethanol, to produce 6α-fluoro-16-methyl-17α,21-dihydroxy-4-pregnene-3,20-dione 21-acylate (X) or with aqueous acid, e.g., hydrochloric acid in acetic acid to produce 6α - fluoro-16-methyl-17α,21-dihydroxy-4-pregnene-3,20-dione (XI) or, under mild acid conditions, the corresponding 21-acetate (X). The reaction conditions which remove the 3-ketal group also dehydrate the 5α-hydroxy group to produce a Δ⁴-double bond and isomerize the 6β-fluoro group to a 6α-fluoro group. The 21-acylate group, if retained, can thereafter be hydrolyzed to a 21-hydroxy group with aqueous base, e.g., sodium hydroxide or preferably potassium or sodium bicarbonate in methanol and a nitrogen atmosphere.

ROUTE B

A shorter route and thus sometimes preferred route to 6α-fluoro-16-methyl-17α,21-dihydroxy-4-pregnene - 3, 20-dione and 21-esters thereof involves esterifying 16-methylpregnenolone (I), the term comprising both the 16α- and 16β-isomers, under enolizing conditions, e.g., with acetic anhydride and a strong acid catalyst, to produce 3β,20-dihydroxy-16-methyl-5,17(20)-pregnadiene-3, 20-diacetate (XII) which is then converted, preferably without isolation, with a peracid, e.g., peracetic or perbenzoic acid, to 3β,20-dihydroxy-5α,6α,17α,20-diepoxy-16-methylpregnane-3,20-diacetate (XIII), in exactly the manner that pregnenolone has been converted to the diepoxide of its 3,20-diacetate. This compound is hydrolyzed, preferably without isolation, with aqueous base, e.g., sodium hydroxide or potassium hydroxide, to produce 3β,17α - dihydroxy-5α,6α-epoxy-16-methylpregnan-20-one (XIV). A by-product in the above series of reactions is the corresponding 5β,6β-epoxide. This compound is desirably separated from the desired 5α,6α-epoxide, e.g., by fractional crystallization of XIII or by converting the mixture of XIV and the corresponding 5β,6β-epoxide to a 3-acylate thereof (XV), e.g., formate, acetate, trifluoro acetate, benzoate, preferably a lower-hydrocarbon acylate, and separating these epoxides, e.g., by chromatography or fractional crystallization. 3β,17α-dihydroxy-5α,6α-epoxy-16-methylpregnan-20-one (XIV) or a 3-acylate thereof (XV) is converted with anhydrous hydrogen fluoride, e.g., in chloroform or methylene chloride in the presence of tetrahydrofuran at −60° C. to +20° C., or aqueous hydrogen fluoride, e.g., at 0° to 30° C., to 3β,5α,17α-trihydroxy-6β-fluoro-16-methylpregnan-20-one (XVII) and 3β,5α,17α-trihydroxy-6β-fluoro-16-methylpregnan-20-one 3-acylate (XVI), respectively. The latter compound (XVI) is hydrolyzed with acid, e.g., hydrochloric, sulfuric or boron trifluoride in methanol, to produce the former compound (XVII), which is then brominated, e.g., with a molar equivalent of bromine in chloroform or acetic acid to produce 3β, 5α,17α-trihydroxy-6β-fluoro-16-methyl - 21 - bromopregnan-20-one (XVIII). Reaction of this compound with alkali-metal lower-hydrocarbon acylate, e.g., potassium acetate, sodium acetate, sodium formate, sodium propionate, potassium β-cyclopentylpropionate, sodium benzoate, etc., is productive of 3β,5α,17α,21-tetrahydroxy-6β-fluoro-16-methylpregnan-20-one 21-acylate (XIX). Oxidation of this compound with sodium dichromate in glacial acetic acid, chromic anhydride and aqueous sulfuric acid in acetone or methylene chloride or an N-haloamide or N-haloimide in pyridine is productive of 5α, 17α,21 - trihydroxy-6β-fluoro-16-methylpregnane - 3,20-dione 21-acylate (XX). Reaction of this compound with acid, e.g., hydrogen chloride in CHCl₃, preferably in the presence of a lower-alkanol, e.g., methanol or ethanol, is productive of 6α-fluoro-16-methyl-17α,21-dihydroxy-4-pregnene-3,20-dione 21-acylate (X), which is hydrolyzed with base in the manner described hereinbefore to 6α-fluoro - 16 - methyl-17α,21-dihydroxy-4-pregnene-3,20-dione (XI).

The following examples are illustrative of the process and products of the present invention, but are not to be construed as limiting.

EXAMPLE 1

*3β-hydroxy-16α-methyl-5,17(20)-pregnadien-21-oic acid methyl ester*

To a stirred solution of 16.5 g. of 16α-methylpregnenolone [Marker and Crooks, J. Am. Chem. Soc., 64, 1280 (1942)] in 250 ml. of tertiary butyl alcohol at 60° C. in a nitrogen atmosphere was added 28 ml. of ethyl oxalate followed by 26 g. of a 25.7% w./w. solution of sodium methoxide in methanol. The cloudy mixture was allowed to cool to 25–30° C. and stirred for two hours. To the solution containing the sodium enolate of 16α-methyl-21-ethoxyoxalylpregnenolone was added a cold solution of 7.2 ml. of acetic acid and 8.3 g. of sodium acetate in 350 ml. of methanol and the mixture was cooled to 0° C. With continued cooling there was then added over a period of about 10 minutes an ice cold solution of 24 g. of bromine in 240 ml. of methanol. To the resulting solution was then rapidly added 58.5 g. of 25.7% w./w. sodium methoxide in methanol. Cooling was discontinued and stirring was continued for 1.5 hours. To the solution containing 3β-hydroxy-5,6-dibromo-16α-methyl-17(20)-pregnen - 21 - oic acid methyl ester there was then added 80 ml. of acetic acid and 15 g. of zinc dust and stirring was continued for 30 minutes. The mixture was filtered and the filtrate evaporated to a thick paste which was shaken with methylene chloride and water. The methylene chloride phase was separated, evaporated to dryness and then redissolved in a small amount of methylene chloride. The solution was chromatographed on 600 g. of magnesium silicate (Florisil). The column was eluted with 1,200-ml. portions of solvent of the following composition and order: 15 of hexanes (Skellysolve B) plus 3% acetone, 2 of hexanes plus 5% acetone, 2 of hexanes plus 20% acetone and 1 of acetone. Fractions 5 to 12 were combined, freed of solvent and the residue recrystallized from hexanes to give 3β-hydroxy-16α-methyl-5,17(20)-pregnadien-21-oic acid methyl ester as a mixture of cis and trans isomers in two crops, the first melting at 70° to 74° C., and the second at 82° to 105° C. Two crystallizations of the first crop from slowly evaporating hexanes gave needles melting at 79° to 81° C., having an [α]$_D$ of —65° (CHCl$_3$) and the correct carbon-hydrogen analysis. Two further recrystallizations from ethyl acetate and one from dilute methanol gave the pure trans isomer melting at 161° to 163° C., [α]$_D$ —77° (HCCl$_3$).

Substituting 16β-methylpregnenolone [J. Romo et al., Bol. Inst. Univ. N. Auton. Mex., IV, 125 (1952); C.A., 9399i (1954)] as the starting steroid in Example 1 is productive of 3β-hydroxy-16β-methyl-5,17(20) - pregnadien-21-oic acid methyl ester.

Following the procedure above, but substituting another sodium lower-alkoxide in an alkanol for the sodium methoxide in methanol employed therein, there is produced other lower-alkyl esters of 3β-hydroxy-16α-methyl-17(20)-pregnen-21-oic acid and 3β-hydroxy-16β-methyl-17(20)-pregnen-21-oic acid wherein the ester group is ethyl, propyl, butyl, octyl, etc.

EXAMPLE 2

3β-hydroxy-5α,6α-epoxy-16α-methyl-17(20)-pregnen-21-oic acid methyl ester

To a solution of 5.0 g. of 3β-hydroxy-16α-methyl-5,17(20)-pregnadien-21-oic acid methyl ester in 100 ml. of chloroform cooled to 0° C. was added 1.0 g. of sodium acetate followed, with vigorous stirring, by 10 ml. of 40% peracetic acid. The mixture was stirred for 5 hours at 0° to 5° C. and then mixed with a solution of 2.5 g. of sodium sulfite in 75 ml. of water. The cooling was discontinued and stirring was continued for 30 minutes. The organic layer was separated, washed with aqueous sodium bicarbonate solution, dried and evaporated at reduced pressure. The crystalline residue was recrystallized from a mixture of acetone and hexanes to give 3.44 g. of 3β-hydroxy-5α,6α-epoxy-16α-methyl-17(20)-pregnen-21-oic acid methyl ester melting at 110–122° C. More of the same product melting at 113–124° C. can be obtained by chromatographing the mother liquors in the manner described above. Recrystallization from a mixture of hexanes and acetone gave needles melting at 118–125° C., having an [α]$_D$ of —66° (CHCl$_3$) and the correct carbon-hydrogen analysis.

Following the above procedure, but substituting 3β-hydroxy-16β - methyl - 5,17(20) - pregnadien - 21 - oic acid methyl ester as the starting steroid, there is thus produced 3β-hydroxy-5α,6α-epoxy-16β - methyl - 17(20) - pregnen-21-oic acid methyl ester.

Similarly, other 3β-hydroxy-5α,6α-epoxy-16α-methyl-17(20)-pregnen-21-oic acid lower-alkyl esters and 3β-hydroxy-5α,6α-epoxy-16β-methyl - 17(20) - pregnen - 21-oic acid lower-alkyl esters, e.g., methyl, propyl, butyl, octyl, etc., are prepared by substituting the corresponding esters of 3β-hydroxy-16α-methyl-5,17(20)-pregnadien-21-oic acid and 3β-hydroxy-16β-methyl-5,17(20)-pregnadien-21-oic acid, respectively, as the starting steroid.

EXAMPLE 3

3β,5α-dihydroxy-6β-fluoro-16α-methyl-17(20)-pregnen-21-oic acid methyl ester

To a solution of 7.5 g. of anhydrous hydrogen fluoride in 15 ml. of tetrahydrofuran cooled in a Dry-Ice-methanol bath was added a solution of 3.64 g. of 3β-hydroxy-5α,6α-epoxy-16α-methyl - 17(20) - pregnen - 21 - oic acid methyl ester in 20 ml. of methylene chloride chilled to —10° C. After swirling, the reddish-brown mixture was stored at —10° C. for 2 hours and then at 5° C. for 2.5 hours. The mixture was then cautiously added to 500 ml. of ice water containing 30 g. of sodium bicarbonate. The neutralized organic layer was separated, using additional methylene chloride, dried and evaporated. The residue was redissolved in methylene chloride and chromatographed on magnesium silicate. The column was eluted with 300-ml. portions of solvent of the following composition and order: 5 of hexanes plus 7% acetone, 20 of hexanes plus 10% acetone, 5 of hexanes plus 15% acetone and 1 of acetone. Fractions 11 to 24, when freed of solvent, gave 3.30 g. of 3β,5α-dihydroxy-6β-fluoro-16α-methyl-17(20) - pregnen - 21 - oic acid methyl ester.

Following the above procedure, but substituting 3β-hydroxy-5α,6α-epoxy-16β-methyl-17(20)-pregnen - 21-oic acid methyl ester as the starting steroid, there is thus produced 3β,5α-dihydroxy-6β-fluoro - 16β - methyl - 17(20)-pregnan-21-oic acid methyl ester.

Similarly, other 3β,5α-dihydroxy-6β-fluoro-16α-methyl-17(20)-pregnen-21-oic acid lower-alkyl esters and 3β,5α-dihydroxy-6β-fluoro-16β-methyl-17(20)-pregnen - 21 - oic acid lower-alkyl esters are prepared by substituting the corresponding lower-alkyl esters, e.g., ethyl, propyl, butyl, octyl, etc., of 3β - hydroxy - 5α,6α - epoxy - 16α - methyl-17(20)-pregnen-21-oic acid and 3β-hydroxy-5α,6α-epoxy-16β-methyl-17(20)-pregnen-21-oic acid, respectively, as the starting steroid.

EXAMPLE 4

3-keto-5α-hydroxy-6β-fluoro-16α-methyl-17(20)-pregnen-21-oic acid methyl ester

A solution of 2.8 g. of 3β,5α-dihydroxy-6β-fluoro-16α-methyl-17(20)-pregnen-21-oic acid methyl ester in 28 ml. of acetic acid was cooled to 15° C. and to the stirred solution was added a similarly cooled solution of 2.8 g. of sodium dichromate dihydrate in 50 ml. of acetic acid. The cooling bath was removed and the mixture was stirred for 1.5 hours. Dilution with water gave an amorphous solid which was collected on a filter, washed with water and dried. The 2.43 g. of 3-keto-5α-hydroxy-6β-fluoro-16α-methyl-17(20)-pregnen-21-oic acid methyl ester thus obtained was recrystallized from a mixture of hexanes and acetone to give crystals melting at 154° to 160° C. The mother liquors were chromatographed on magnesium silicate. Hexanes plus 5% acetone eluted the desired product, which, when recrystallized from a mixture of hexanes and acetone, was obtained as feathery needles melting at 165° to 166° C., having an [α]$_D$ of plus 16° (CHCl$_3$) and the analysis below.

Calcd. for $C_{23}H_{33}O_4F$: C, 70.38; H, 8.47; F, 4.84. Found: C, 70.45; H, 8.58; F, 4.89.

Following the above procedure, but substituting 3β,5α-dihydroxy-6β-fluoro-16β-methyl-17(20) - pregnen - 21-oic acid methyl ester as the starting steroid, there is thus produced 3-keto-5α - hydroxy - 6β - fluoro - 16β - methyl-17(20)-pregnen-21-oic acid methyl ester.

Similarly, other 3-keto-5α - hydroxy - 6β - fluoro - 16α-methyl-17(20)-pregnen-21-oic acid lower-alkyl esters and 3-keto-5α-hydroxy-6β-fluoro-16β-methyl - 17(20) - pregnen-21-oic acid lower-alkyl esters are prepared by substituting the corresponding lower-alkyl esters, e.g., ethyl, propyl, butyl, octyl, etc., of 3β,5α-dihydroxy-6β-fluoro-16α-methyl-17(20)-pregnen-21-oic acid and 3β,5α-dihydroxy-6β-fluoro-16β-methyl-17(20)-pregnen-21-oic acid, respectively, as the starting steroid.

EXAMPLE 5

*3-keto-5α-hydroxy-6β-fluoro-16α-methyl-17(20)-pregnen-21-oic acid methyl ester 3-ethylene ketal*

A mixture of 2.00 g. of 3-keto-5α-hydroxy-6β-fluoro-16α-methyl-17(20)-pregnen-21-oic acid methyl ester, 0.08 g. of p-toluenesulfonic acid monohydrate, 10 ml. of ethylene glycol and 100 ml. of dry benzene was heated under reflux with concomitant removal of the water of reaction for 3.5 hours. The mixture was then cooled, washed to neutrality with aqueous sodium bicarbonate, dried and then evaporated to dryness to leave a residue of 3-keto-5α-hydroxy-6β-fluoro-16α-methyl-17(20)-pregnen-21-oic acid methyl ester 3-ethylene ketal.

Substituting another lower-alkyl α- or β-glycol, e.g., propylene glycol, trimethylene glycol, 2,3-butylene glycol, 2,2-dimethyl-trimethylene glycol, octylene glycol, etc., or the corresponding dioxolanes produced by the reaction of these glycols with acetone or methyl ethyl ketone, for the ethylene glycol is productive of the corresponding lower-alkylene glycol ketal of 3-keto-5α-hydroxy-6β-fluoro-16α-methyl-17(20)-pregnen-21-oic acid methyl ester.

Similarly, substituting 3-keto-5α-hydroxy-6β-fluoro-16β-methyl-17(20)-pregnen-21-oic acid methyl ester as the starting steroid in the above-described reaction is productive of 3-keto-5α-hydroxy-6β-fluoro-16β-methyl-17(20)-pregnen-21-oic acid methyl ester 3-ethylene ketal. Other lower-alkylene ketals are prepared in the manner described above. Other lower-alkyl esters, e.g., ethyl, propyl, butyl, octyl, etc., of the above-described acids are converted to the corresponding ethylene, etc., ketals by substituting them for the methyl esters in the above-described reactions.

EXAMPLE 6

*5α,21-dihydroxy-6β-fluoro-16α-methyl-17(20)-pregnen-3-one 3-ethylene ketal*

The 3-keto-5α-hydroxy-6β-fluoro-16α-methyl-17(20)-pregnen-21-oic acid methyl ester 3-ethylene ketal obtained in the manner described in Example 5 was dissolved in 50 ml. of anhydrous ether and added dropwise in 10 minutes to a stirred mixture of 1.5 g. of lithium aluminum hydride and 100 ml. of anhydrous ether under a nitrogen atmosphere. The mixture was stirred for 1.5 hours and then 25 ml. of ethyl acetate followed by 50 ml. of water were cautiously added. The ether layer was separated and the aqueous layer extracted three times with ethyl acetate. The combined organic layers were dried and evaporated at reduced pressure, leaving a residue of 5α,21-dihydroxy-6β-fluoro-16α-methyl-17(20)-pregnen-3-one 3-ethylene ketal.

Substituting 3-keto-5α-hydroxy-6β-fluoro-16β-methyl-17(20)-pregnen-21-oic acid methyl ester 3-ethylene ketal as the starting steroid in the above reaction is productive of 3-keto-5α,21-dihydroxy-6β-fluoro-16β-methyl-17(20)-pregnen-3-one 3-ethylene ketal.

The other lower-alkyl esters of 3-keto-5α-hydroxy-6β-fluoro-16α-methyl-17(20)-pregnen-21-oic acid 3-ethylene ketal and 3-keto-5α-hydroxy-6β-fluoro-16β-methyl-17(20)-pregnen-21-oic acid 3-ethylene ketal, e.g., ethyl, propyl, butyl, octyl, etc., are similarly reduced to 5α,21-dihydroxy-6β-fluoro-16α-methyl-17(20)-pregnen-3-one 3-ethylene ketal, and 5α,21-dihydroxy-6β-fluoro-16β-methyl-17(20)-pregnen-3-one 3-ethylene ketal, respectively. Substituting other lower-alkylene ketals, e.g., propylene, trimethylene, 2,3-butylene, 2,2-dimethyltrimethylene ketal, for the above described ethylene ketals in the above-described reactions is productive of the corresponding lower-alklene ketals of 5α,21-dihydroxy-6β-fluoro-16α-methyl-17(20)-pregnen-3-one and 5α,21-dihydroxy-6β-fluoro-16β-methyl-17(20)-pregnen-3-one.

EXAMPLE 7

*5α,21-dihydroxy-6β-fluoro-16α-methyl-17(20)-pregnen-3-one 3-ethylene ketal 21-acetate*

The 5α,21-dihydroxy-6β-fluoro-16α-methyl-17(20)-pregnen-3-one 3-ethylene ketal obtained according to the method of Example 6 was mixed with 25 ml. of pyridine and 25 ml. of acetic anhydride and maintained at room temperature for 6 hours. The mixture was poured into a mixture of ice and water and the precipitated solid separated by filtration, dissolved in methylene chloride, the solution dried and then chromatographed on 40 g. of magnesium silicate. The column was developed with 13 75-ml. fractions of hexanes plus 1% acetone. Each fraction contained some 5α,21-dihydroxy-6β-fluoro-16α-methyl-17-(20)-pregnen-3-one 3-ethylene ketal 21-acetate which had identical solution infrared spectrums. A sample on long standing in hexanes gave crystals melting at 125° to 129° C. and having the analysis below.

Calcd. for $C_{26}H_{39}O_5F$: C, 69.30; H, 8.72; F, 4.22. Found: C, 69.28; H, 9.09; F, 4.36.

Substituting 5α,21-dihydroxy-6β-fluoro-16β-methyl-17-(20)-pregnen-3-one 3-ethylene ketal as the starting steroid in the above-described reaction, there is thus produced 5α,21-dihydroxy-6β-fluoro-16β-methyl-17(20)-pregnen-3-one 3-ethylene ketal 21-acetate.

Similarly, instead of the 3-ethylene ketal starting compounds described above, there can be employed instead another lower-alkylene ketal, e.g., propylene ketal, trimethylene ketal, 2,2-dimethyl-trimethylene ketal, octylene ketal, etc., to produce the corresponding lower-alkylene ketal of 5α,21-dihydroxy-6β-fluoro-16α-methyl-17(20)-pregnen-3-one 21-acetate and 5α,21-dihydroxy-6β-fluoro-16β-methyl-17(20)-pregnen-3-one 21-acetate, respectively.

Similarly, 5α,21-dihydroxy-6β-fluoro-16α-methyl-17(20)-pregnen-3-one 3-ethylene ketal and 5α,21-dihydroxy-6β-fluoro-16β-methyl-17(20)-pregnen-3-one 3-ethylene ketal are converted to other 5α,21-dihydroxy-6β-fluoro-16α-methyl-17(20)-pregnen-3-one 3-ethylene ketal 21-acylates and 5α,21-dihydroxy-6β-fluoro-16β-methyl-17(20)-pregnen-3-one 3-ethylene ketal 21-acylates, respectively, by esterification of the 21-hydroxy group, e.g., by reaction with the appropriate acid anhydride, acid chloride or bromide, ester by ester exchange, acid in the presence of an esterification catalyst, etc. Examples of these compounds include those wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentyipropionic, cyclohexylformic, cyclohexylacetic, β-cyclohexylpropionic, an aryl or alkaryl acid, e.g., benzoic, 2,3, or 4-methylbenzoic, 2,3-, 2,4-, 2,5, 2,6-, 3,4-dimethylbenzoic, ethylbenzoic, 2,4,6-trimethylbenzoic, 2,4,6-triethylbenzoic, α-naphthoic, 3-methyl-α-naphthoic, an aralykl acid, e.g., phenylacetic, phenylpropionic, diphenyl-acetic, triphenylacetic, a dibasic acid (which can be converted to water soluble, e.g., sodium, salts), e.g., succinic, glutaric, α-methylglutaric, β-methylglutaric, β,β-dimethylglutaric, adipic, pimelic, suberic acid.

EXAMPLE 8

*5α,17α,21-trihydroxy-6β-fluoro-16α-methylpregnane-3,20-dione 3-ethylene ketal 21-acetate*

To a stirred solution of 1.85 g. of 5α,21-dihydroxy-6β-fluoro-16α-methyl-17(20)-pregnen-3-one 3-ethylene ketal 21-acetate, as obtained from the column described in Example 7, in 50 ml. of tertiary butyl alcohol and 1.2 ml. of pyridine was added 9.5 ml. of N-methylmorpholine oxide peroxide in tertiary butyl alcohol, titrating 41 ml. of 0.1 N sodium thiosulfate per ml., and approximately 10 mg. of oxmium tetroxide. The mixture was stirred for 18 hours and then mixed with a solution of 0.25 g. of sodium hydrosulfite in 100 ml. of water. The resulting mixture was extracted three times with methylene chloride which was then dried and evaporated to dryness. The residue was redissolved in methylene chloride and chromatographed on 100 g. of magnesium silicate. The column was eluted with 200-ml. portions of solvent of the following composition and order: 10 hexanes plus 2% acetone, 10 of hexanes plus 5% acetone, 5 of hexanes plus 7% acetone, 2 of hexanes plus 10% acetone and 1 of acetone. Fractions 3 to 10 contained starting material. Fractions 16 to 25 contained crystals of $5\alpha,17\alpha,21$-trihydroxy - $6\beta$-fluoro - $16\alpha$-methylpregnane-3,20-dione 3-ethylene ketal 21-acetate which, when recrystallized from a mixture of acetone and hexanes, was obtained as rods melting at 213° to 214° C., having an $[\alpha]_D$ of 0° ($CHCl_3$) and the analysis below.

Calcd. for $C_{26}H_{39}O_7F$: C, 64.71; H, 8.15; F, 3.94. Found: C, 64.98; H, 8.53; F, 3.48.

Substituting $5\alpha,21$-dihydroxy-$6\beta$-fluoro - $16\beta$-methyl-17(20)-pregnen-3-one 3-ethylene ketal 21-acetate as the starting steroid in the above reaction is productive of $5\alpha,17\alpha,21$ - trihydroxy - $6\beta$ - fluoro - $16\beta$-methylpregnene-3,20-dione 3-ethylene ketal 21-acetate.

Similarly, other 21-acylates of the above starting compounds wherein the acyl radical is, instead of acetyl, that of an acid named in the paragraph following Example 7, are converted to the corresponding $5\alpha,17\alpha,21$-trihydroxy-$6\beta$-fluoro-$16\alpha$-methylpregnane-3,20-dione 3-ethylene ketal 21 - acylates and $5\alpha,17\alpha,21$ - trihydroxy-$6\beta$ - fluoro-$16\beta$-methylpregnane-3,20-dione 3-ethylene ketal 21-acylates, respectively.

Instead of the 3-ethylene ketal starting compound described above, there can be employed instead another lower-alkyene ketal, e.g., propylene ketal, trimethylene ketal, 2,3-butylene ketal, 2,2-dimethyl-trimethylene ketal, octylene ketal, etc., to produce the corresponding lower-alkylene ketal of $5\alpha,17\alpha,21$-trihydroxy-$6\beta$-fluoro-$16\alpha$-methylpregnane-3,20-dione 21-acetate and $5\alpha,17\alpha,21$-trihydroxy-$6\beta$-fluoro-$16\beta$-methylpregnane-3,20-dione 21-acetate, respectively.

EXAMPLE 9

*$6\alpha$-fluoro-$16\alpha$-methyl-$17\alpha,21$-dihydroxy-4-pregnene-3,20-dione 21-acetate*

A solution of 0.36 g. of crude crystalline $5\alpha,17\alpha,21$-trihydroxy - $6\beta$ - fluoro - $16\alpha$ - methylpregnane - 3,20 - dione 3-ethylene ketal 21-acetate in 10 ml. of chloroform and 0.1 ml. of absolute ethanol was cooled to —5° C. and saturated with dry hydrogen chloride. The gas was continuously bubbled into the mixture for one hour while maintaining the temperature at 0° C. or lower. The still cold solution was then cautiously shaken with aqueous sodium bicarbonate solution and the neutralized solution was dried with sodium sulfate, evaporated, and the residue redissolved in methylene chloride which was then chromatographed on 25 g. of magnesium silicate. The column was developed with 50-ml. portions of solvent of the following composition and order: 5 of hexanes plus 5% acetone, 10 of hexanes plus 10% acetone and 1 of acetone. Fractions 8 to 13 contained crystals of $6\alpha$-fluoro - $16\alpha$ - methyl - $17\alpha,21$ - dihydroxy - 4 - pregnene-3,20-dione 21-acetate which, when recrystallized from a mixture of hexanes and acetone, melted at 186° to 195° C. A second recrystallization from a mixture of ethyl acetate and hexanes raised the melting point to 196° to 198° C. These crystals had an $[\alpha]_D$ of $+100°$ ($CHCl_3$);

$\lambda_{max.}$ 237 m$\mu$, E=15,400; $\gamma_{max.}^{Nujol}$ 3410, 3360 sh., 1740, 1723, 1682 to 1650 (doublet, crystal effect), 1625, 1270, 1252 and 1240 cm.$^{-1}$ and the analysis below.

Calcd. for $C_{24}H_{33}O_5F$: C, 68.55; H, 7.91; F, 4.52. Found: C, 68.36; H, 8.02; F, 4.14.

Substituting $5\alpha,17\alpha,21$ - trihydroxy - $6\beta$ - fluoro - $16\beta$-methyl- pregnane-3,20-dione 3-ethylene ketal 21-acetate as the starting steroid in the above-described reaction is productive of $6\alpha$ - fluoro - $16\beta$ - methyl - $17\alpha,21$ - dihydroxy-4-pregnene-3,20-dione 21-acetate.

Similarly, other 21-acylates of the above starting compounds wherein the acyl radical is, instead of acetyl, that of an acid named in the paragraph following Example 7, are converted to the corresponding $6\alpha$-fluoro-$16\alpha$-methyl-$17\alpha,21$ - dihydroxy - 4 - pregnene - 3,20 - dione - 21 - acylates and $6\alpha$ - fluoro - $16\beta$ - methyl - $17\alpha,21$ - dihydroxy - 4 - pregnene - 3,20 - dione 21 - acylates, respectively.

Compounds otherwise corresponding to the above-named compounds but wherein the 3-ketal group is another lower-alkylene ketal, e.g., propylene ketal, trimethylene ketal, 2,3-butylene ketal, 2,2-dimethyl-trimethylene ketal, octylene ketal, etc., are hydrolyzed to the same compounds as the corresponding 3-ethylene ketals.

EXAMPLE 10

*$6\alpha$ - fluoro - $16\alpha$ - methyl - $17\alpha,21$ - dihydroxy - 4 - pregnene - 3,20 - dione*

A solution of 0.15 g. of $6\alpha$-fluoro-$16\alpha$-methyl-$17\alpha,21$-dihydroxy-4-pregnene-3,20-dione 21-acetate in 15 ml. of methanol was flushed with nitrogen and a similarly treated solution of 0.08 g. of potassium bicarbonate in 1.5 ml. of water was added. The mixture was stirred under nitrogen for 5 hours after which 0.1 ml. of acetic acid in 5 ml. of water was added and the resulting mixture concentrated to a small volume at reduced pressure. The crystals which separated were collected on a filter, washed with water and dried. There was obtained 0.11 g. of $6\alpha$ - fluoro - $16\alpha$ - methyl - $17\alpha,21$ - dihydroxy - 4 - pregnene-3,20-dione as plates melting at 177° to 188° C. A portion recrystallized from a mixture of hexanes and acetone was obtained as needles melting at 184° to 186° C. and having the analysis below.

Calcd. for $C_{22}H_{31}O_4F$: C, 69.81; H, 8.26; F, 5.02. Found: C, 70.01; H, 8.13; F, 4.86.

Substituting $6\alpha$ - fluoro - $16\beta$ - methyl - $17\alpha,21$ - dihydroxy - 4 - pregnene - 3,20 - dione 21-acetate as the starting compound in the above-described reaction is productive of $6\alpha$ - fluoro - $16\beta$ - methyl - $17\alpha,21$ - dihydroxy-4-pregnene-3,20-dione.

EXAMPLE 11

*$3\beta\cdot 17\alpha$ - dihydroxy - $5\alpha,6\alpha$ - epoxy - $16\alpha$ - methyl-pregnane - 20 - one 3 - acetate*

A solution of 66.0 g. of $16\alpha$-methylpregnenolone and 38 g. of p-toluenesulfonic acid monohydrate in 3 l. of acetic anhydride was stirred and slowly distilled for 18 hours. The rate of distillation was controlled so that 1 to 2 l. of distillate was removed. The reaction mixture was then concentrated to dryness at reduced pressure on a steam bath. The residue was taken up in 400 ml. of chloroform which was then washed with aqueous sodium bicarbonate, water and then dried.

To the resulting solution containing $3\beta,20$-dihydroxy-$16\alpha$ - methyl - 5,17(20) - pregnadiene 3,20 - diacetate was added a cold solution of 16 g. of anhydrous sodium acetate in 360 ml. of 40% peracetic acid. During the addition the reaction mixture was stirred and maintained at or below 15° C. Then the mixture was allowed to warm to room temperature and stirred for an additional 2.5 hours. The chloroform layer was separated and washed with water and then cold 5% aqueous sodium hydroxide until the washings were basic.

To the resulting solution containing $3\beta,20$-dihydroxy-$5\alpha,6\alpha,17\alpha,20\alpha$ - diepoxy - $16\alpha$ - methylpregnane 3,20 - diacetate was added 2 l. of methanol followed by 860 ml. of 1.5 N aqueous sodium hydroxide. The mixture was stirred for 45 minutes and then diluted with 860 ml. of water. The organic layer was separated and the aqueous layer was extracted 4 times, each time with 700 ml. of methylene chloride. The combined organic layer and extracts were washed with water, dried and then distilled to dryness at reduced pressure on a steam bath.

The residual 3β,17α-dihydroxy-5α,6α-epoxy-16α-methylpregnan-20-one was dissolved in a mixture of 400 ml. of pyridine and 400 ml. of acetic anhydride and then maintained at room temperature for 16 hours. The mixture was then poured into 10 l. of ice and water and extracted twice with 1,500-ml. portions of methylene chloride. The extracts were washed with dilute hydrochloric acid, dilute aqueous sodium bicarbonate and water and then dried and chromatographed over 2,500 g. of magnesium silicate. The column was developed with hexanes containing increasing amounts of acetone. Hexanes plus 5% and plus 10% acetone eluted 3β,17α-dihydroxy - 5α,6α - epoxy - 16α - methylpregnan - 20 - one 3-acetate which, when recrystallized from a mixture of acetone and hexanes, melted at 192° to 195° C. Further recrystallization raised the melting point to 194° to 197° C., [α]$_D$ —78° (CHCl$_3$).

The hexanes plus 5% acetone eluates contained 3β,17α-dihydroxy - 5β,6β - epoxy - 16α - methylpregnan - 20 - one 3-acetate, an analytical sample of which melted at 196° to 199° C., [α]$_D$ —40° (CHCl$_3$). Both epoxides had the correct carbon-hydrogen analysis.

Substituting 16β-methylpregnenolone as the starting compound in the above series of reactions is productive of 3β,17α - dihydroxy - 5α,6α - epoxy - 16β - methyl - pregnan-20-one 3-acetate and the corresponding 5β,6β-epoxy isomer.

Similarly, 3β,17α - dihydroxy-5α,6α-epoxy-16α-methylpregnan-20-one and 3β,17α-dihydroxy-5α-6α-epoxy-16β-methylpregnan-20-one are converted to other 3β,17α-dihydroxy-5α,6α-epoxy-16α-methylpregnan-20-one 3 - acylates and 3β,17α - dihydroxy - 5α,6α-exopy-16β-methylpregnan-20-one 3-acylates, respectively, by esterification of the hydroxy group, e.g., by reaction with the appropriate acid anhydride, acid chloride or bromide, ester by ester exchange, acid in the presence of an esterification catalyst, etc., to produce compounds wherein the acyl radical of 3-acylate group is, e.g., that of an acid named in the paragraph following Example 7.

EXAMPLE 12

*3β,5α,17α-trihydroxy-6β-fluoro-16α-methyl-pregnan-20-one-3-acetate*

To 7.25 g. of liquid hydrogen fluoride at —60° C. was added 14 ml. of purified tetrahydrofuran followed by 5.0 g. of 3β,17α - dihydroxy - 5α,6α - epoxy - 16α - methyl-pregnan-20-one in 50 ml. of methylene chloride, chilled in a Dry Ice bath before adding. The cooling bath was removed and the mixture was maintained at 14° C. for 3.5 hours and then poured into 150 ml. of water. The mixture was diluted with an additional 500 ml. of water and then extracted 5 times, each time with 200 ml. of methylene chloride. The extracts were washed with 10% hydrochloric acid, 5% aqueous sodium bicarbonate, water and then dried. The dried solution was evaporated to dryness at reduced pressure, leaving 3.22 g. of 3β,5α-17α-trihydroxy-6β-fluoro-16α-methylpregnan-20-one 3-acetate melting at 253° to 257° C. (dec.). An analytical sample, recrystallized from acetone, melted at 248° to 252° C., had an [α]$_D$ of —31° (dioxane) and the analysis below.

Calcd. for C$_{24}$H$_{37}$O$_5$F: C, 67.89; H, 8.79; F, 4.48. Found: C, 68.35; H, 9.16; F, 4.40.

Substituting 3β,17α-dihydroxy-5α,6α-epoxy-16β-methylpregnan-20-one 3-acetate as the starting compound in the above-described reaction is productive of 3β,5α,17α-trihydroxy-6β-fluoro-16β-methylpregnan-20-one 3-acetate.

Similarly, other 3β,17α-dihydroxy-5α,6α-epoxy-16α-methylpregnan-20-one 3-acylates and 3β,17α-dihydroxy-5α-6α-epoxy-16β-methylpregnan-20-one 3-acylates wherein the acyl radical of the acylate group is that of an acid named in the paragraph following Example 7, are converted to the corresponding 3β,5α-17α-trihydroxy-6β-fluoro 16α-methylpregnan-20-one 3-acylates and 3β,5α,17α-trihydroxy-6β-fluoro-16β-methylpregnan-20-one 3 - acylates, respectively.

EXAMPLE 13

*3β,5α,17α-trihydroxy-6β-fluoro-6α-methyl-pregnan-20-one*

A slurry consisting of a 2.88 g. of 3β,5α,17α-trihydroxy-6β-fluoro-16α-methylpregnan-20-one 3-acetate, 10 ml. of boron trifluoride etherate and 800 ml. of methanol was stirred at room temperature for 21 hours. 200 ml. of water was then added and the solution concentrated at reduced pressure at 60° C. The crystalline precipitate was separated and dried to give 2.39 g. of 3β,5α,17α-trihydroxy-6β-fluoro-16α-methylpregnan-20-one melting at 232° to 235° C. (dec.). An analytical sample, recrystallized from acetone, melted at 248° to 257° C. (dec.).

Substituting 3β,5α,17α - trihydroxy-6β-fluoro-16β-methylpregnan-20-one 3-acetate as the starting steroid in the above-described reaction is productive of 3β,5α,17α-trihydroxy-6β-fluoro-16β-methylpregnan-20-one.

Similarly, other 3β,5α,17α - trihydroxy - 6β-fluoro-16α-methylpregnan-20-one 3-acylates and 3β,5α,17α-trihydroxy-6β-fluoro-16β-methylpregnan - 20 - one 3 - acylates wherein the acyl radical of the 3-acylate group is, e.g., that of an acid named in the paragraph following Example 7, are converted with boron trifluoride in methanol or with aqueous hydrochloric acid in methanol or other lower-alkanol, refluxed for about 15 minutes, to 3β,5α,17α-trihydroxy - 6β - fluoro - 16α-methylpregnan-20-one and 3β,5α,17α-trihydroxy-6β-fluoro-16α-methylpregnan-20-one respectively.

EXAMPLE 14

*3β,5α,17α - trihydroxy - 6β - fluoro-16α-methyl-21-bromo-pregnan-20-one*

To a solution of 1.6 g. of 3β,5α,17α-trihydroxy-6β-fluoro-16α-methylpregnan-20-one in 1,600 ml. of chloroform was added a solution of 845 mg. of bromine in 32.5 ml. of chloroform. The mixture was maintained at room temperature in the dark for 18 hours. The solution was then washed with dilute aqueous sodium bicarbonate, water and then dried and evaporated to dryness to give 2.05 g. of 3β,5α,17α-trihydroxy-6β-fluoro-16α-methyl - 21 - bromo - pregnan-20-one which was recrystallized from methylene chloride to give crystals melting at 240° C. (dec.). A sample recrystallized from a mixture of hexanes and acetone melted at 247° C. (dec.) and had the analysis below.

Calcd. for C$_{22}$H$_{34}$O$_4$BrF: Br, 17.32; F, 4.12. Found: Br, 17.80; F, 4.01.

The corresponding 3-acetate, i.e., 3β,5α,17α-trihydroxy-6β-fluoro-16α-methyl-21-bromopregnan-20-one 3-acetate, prepared in the manner described above, starting with 3β,5α,17α-trihydroxy-6β-fluoro-16α-methylpregnan-20-one 3-acetate, melted at 262° to 263° C. (dec.).

Substituting 3β,5α,17α-trihydroxy-6β-fluoro-16β-methylpregnan-20-one and 3β,5α,17α-trihydroxy-6β-fluoro-16β-methylpregnan-20-one 3-acetate as the starting steroids in the above described reaction is productive of 3β,5α,17α-trihydroxy-6β-fluoro-16β-methyl-21-bromopregnan-20-one and 3β,5α,17α - trihydroxy-16β-methyl-21-bromopregnan-20-one 3-acetate, respectively.

EXAMPLE 15

*3β,5α,17α,21-tetrahydroxy-6β-fluoro-16α-methyl-pregnan-20-one 21-acetate*

A mixture consisting of 562 mg. of 3β,5α,17α-trihydroxy - 6β - fluoro - 16α - methyl - 21 - bromopregnan-20-one, 26 ml. of acetone, 0.38 ml. of acetic acid, 2.56 g. of potassium acetate and 6 mg. of potassium iodide was refluxed with stirring for 16 hours. The cooled mixture was then diluted with 50 ml. of water. The precipitated 3β,5α,17α,21 - tetrahydroxy - 6β - fluoro - 16α - methylpregnan-20-one 21-acetate was isolated and recrystallized from acetone to give 500 mg. of 3β,5α,17α, 21-tetrahydroxy-6β-fluoro-16α-methylpregnan-20-one 21 - acetate melting at 252° to 257° C. (dec.). An analytical sample melted at 254° to 255° C. (dec.).

Substituting 3β,5α,17α-trihydroxy-6β-fluoro-16β-methyl-21-bromopregnan-20-one as the starting compound in the above-described reaction is productive of 3β,5α,17α,21-tetrahydroxy-16β-methylpregnan-20-one 21-acetate.

Substituting another potassium lower-acylate, e.g., potassium formate, potassium propionate, or other acylate wherein the acyl radical is that of a hydrocarbon carboxylic acid named in the paragraph following Example 7, in the above-described reactions is productive of the corresponding 3β,5α,17α,21 - tetrahydroxy-6β-fluoro-16α-methylpregnan-20-one 21-acylate and 3β,5α,17α,21-tetrahydroxy-6β-fluoro-16β-methylpregnan-20-one 21-acylate, respectively.

EXAMPLE 16

*5α,17α,21-trihydroxy-6β-fluoro-16α-methylpregnane-3,20-dione 21-acetate*

To a solution of 300 mg. of 3β,5α,17α,21-tetrahydroxy-6β-fluoro-16α-methylpregnan-20-one 21-acetate in 50 ml. of acetone at 5° C. was added 0.3 ml. of a chromic anhydride solution consisting of 26.72 g. of chromic anhydride and 23 ml. of concentrated sulfuric acid made up to 100 ml. with water. The mixture was stirred for 5 minutes, 150 ml. of cold water was added and stirring was continued for an additional 30 minutes. The precipitated product was separated, washed with water, dilute aqueous sodium bicarbonate and water, dried and crystallized from acetone to give 224 mg. of 5α,17α,21-trihydroxy - 6β - fluoro - 16α - methylpregnane - 3,20 - dione 21-acetate melting at 239° to 241° C. (dec.). An analytical sample melted at 236° to 239° C. (dec.).

Substituting 3β,5α,17α,21 - tetrahydroxy-6β-fluoro-16β-methylpregnan-20-one 21-acetate as the starting compound in the above-described reaction is productive of 5α,17α,21 - trihydroxy - 6β - fluoro - 16β - methylpregnane-3,20-dione 21-acetate.

Similarly, other 3β,5α,17α,21-tetrahydroxy-6β-fluoro-16α-methylpregnan-3-one 21-acylates and 3β,5α,17α,21-tetrahydroxy-6β-fluoro-16β-methylpregnan-2-one 21-acylates wherein the acyl radical of the acylate group is that of an acid named in the paragraph following Example 7, are converted to the corresponding 5α,17α,21-trihydroxy-6β-fluoro-16α-methylpregnane-3,20-dione 21-acylates and 5α,17α,21 - trihydroxy - 6β - fluoro - 16β - methylpregnane-3,20-dione 21-acylates, respectively.

EXAMPLE 17

*6α-fluoro-16α-methyl-17α,21-dihydroxy-4-pregnene-3,20-dione 21-acetate*

A suspension of 200 mg. of 5α,17α,21-trihydroxy-6β-fluoro-16α-methylpregnane-3,20 dione 21-acetate in 40 ml. of chloroform and 0.4 ml. of absolute alcohol was cooled to —5° C. and hydrogen chloride gas was bubbled through the mixture for two hours while maintaining the temperature of the mixture between —10° and 0° C. The resulting solution was then washed with dilute aqueous sodium bicarbonate, water, dried and evaporated to dryness to give 6α-fluoro-16α-methyl-17α,21-dihydroxy-4-pregnene-3,20-dione 21-acetate melting at 184° to 190° C. Three crystallizations from a mixture of acetone and ethyl acetate raised the melting point to 193° to 197° C.

Substituting 5α,17α,21-trihydroxy-6β-fluoro-16β-methylpregnane-3,20-dione 21-acetate as the starting compound in the above-described reaction is productive of 6α-fluoro-16β-methyl-17α,21-hydroxy-4-pregnene-3,20-dione 21-acetate.

Similarly, other 5α,17α,21-trihydroxy-6β - fluoro - 16α-methylpregnane-3,20-dione 21-acylates and 5α,17α,21-trihydroxy-6β-fluoro-16β-methylpregnane-3,20-dione 21-acylates wherein the acyl radical of the acylate group is that of an acid named in the paragraph following Example 7, are converted to the corresponding 6α-fluoro-16α-methyl-17α,21-dihydroxy-4-pregnene-3,20-dione 21-acylates and 6α-fluoro-16β-methyl-17α,21-dihydroxy-4-pregnene - 3,20-dione 21-acylates, respectively.

*6β-fluoro-16α-methyl-11β,17α,21-trihydroxy-4-pregnene-3,20-dione*

A seed culture of *Cunninghamella blakesleeana* (ATCC 8688b), obtained from spores grown on a 2% agar, 5% malt extract solids at a pH of 6.0, was prepared by growth in a medium containing, per liter of tap water, 10 g. of dextrose (Cerelose) and 20 g. of liquid corn steep liquor (containing about 1.2 g. of solids), adjusted to a pH of about 5 with 25% aqueous sodium hydroxide.

5 one-liter portions of the above medium was inoculated with the seed culture and growth with aeration and shaking was continued for 48 hours. Then 0.2 g. of 6α-fluoro-16α-methyl-17α,21-dihydroxy-4-pregnene - 3,20-dione 21-acetate in 300 ml. of alcohol was added to each flask and fermentation was conducted for another 48 hours, at which time the pH was 5.9.

The mycelium was filtered from the beer and the beer extracted four times with one-fourth by volume amounts of methylene chloride plus 25% ethyl acetate. The extracts were evaporated to dryness. The residue was redissolved in 150 ml. of methylene chloride which was then chromatographed on a column of magnesium silicate which was developed with hexanes containing increasing proportions of acetone. Hexanes plus 5, 7.5, 10 and 20% acetone eluted a mixture containing 6α-fluoro-11β,17α,21-trihydroxy-16α-methyl-4-pregnene-3,20-dione. The mixture was acetylated with a mixture of 5 ml. each of acetic anhydride and pyridine overnight at room temperature and then poured into ice water and extracted with methylene chloride which was washed with dilute hydrochloric acid, dilute aqueous sodium bicarbonate, water and then dried. The dry solution was chromatographed on magnesium silicate. The column was developed with hexanes containing increasing proportions of acetone. Hexanes plus 15% acetone eluted 6α-fluoro-11β,17α,21-trihydroxy-16α-methyl-4-pregnene-3,20-dione 21-acetate which, when recrystallized from a mixture of hexanes and acetone, melted at 238° to 247° C. (dec.).

Following the above procedure, but substituting 6α-fluoro - 17α,21 - dihydroxy-16β-methyl-4-pregnene-3,20-dione 21-acetate as the starting steroid there is thus produced 6α - fluoro-11β,17α,21-trihydroxy-16β-methyl-4-pregnene-3,20-dione and 6α-fluoro-11β,17α,21-trihydroxy-16β-methyl-4-pregnene-3,20-dione 21-acetate.

We claim:
1. Compounds of the formula:

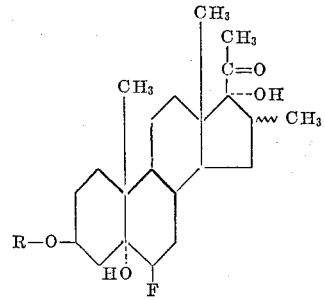

wherein R is selected from the group consisting of hydrogen and the acyl radical of a hydrocarbon carboxylic acid containing from 1 to 12 carbon atoms, inclusive.

2. 3β,5α,17α - tribydroxy - 6β-fluoro-16α-methylpregnan-20-one.

3. 3β,5α,17α - trihydroxy - 6β-fluoro-16α-methylpregnan-20-one 3-acetate.

4. A compound of the formula:

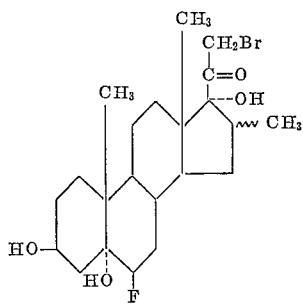

5. 3β,5α,17α - trihydroxy - 6β-fluoro-16α-methyl-21-bromopregnan-20-one.

6. A compound of the formula:

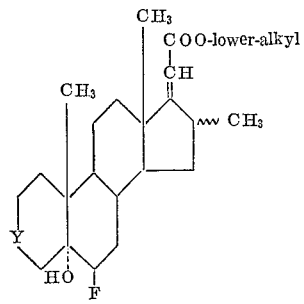

wherein Y is selected from the group consisting of β-hydroxy-methylene, carbonyl and ketalized carbonyl of the formula

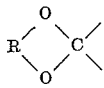

wherein R is lower-alkylene containing from 2 to 3 carbon atoms in the chain.

7. 3β,5α - dihydroxy - 6β-fluoro-16α-methyl-17(20)-pregnen-21-oic acid methyl ester.

8. 3 - keto - 5α-hydroxy-6β-fluoro-16α-methyl-17(20)-pregnen-21-oic acid methyl ester.

9. 3 - keto - 5α-hydroxy-6β-fluoro-16α-methyl-17(20)-pregnen-21-oic acid methyl ester 3-ethylene ketal.

10. A compound of the formula:

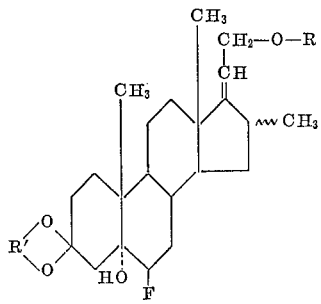

wherein R is selected from the group consisting of hydrogen and the acyl radical of a hydrocarbon carboxylic acid containing from 1 to 12 carbon atoms, inclusive, and R' is lower-alkylene containing from 2 to 3 carbon atoms in the chain.

11. 5α,21 - dihydroxy - 6β-fluoro-16α-methyl-17(20)-pregnen-3-one 21-acetate 3-ethylene ketal.

References Cited by the Examiner

UNITED STATES PATENTS

| | | | |
|---|---|---|---|
| 2,838,496 | 6/58 | Babcock et al. | 260—239.55 |
| 2,838,497 | 6/58 | Spero et al. | 260—239.55 |
| 2,838,528 | 6/58 | Campbell et al. | 260—397.3 |

OTHER REFERENCES

Arth et al.: J.A.C.S. (1958), vol. 80, pp. 3160–3162.
Bowers et al.: 80, J.A.C.S., 4423–24 (1958).
Oliveto et al.: J.A.C.S. (1958), vol. 80, p. 4428.
Taub et al.: J.A.C.S. (1958), vol. 80, p. 4435.

LEWIS GOTTS, *Primary Examiner.*

L. H. GASTON, M. LIEBMAN, *Examiners.*